UNITED STATES PATENT OFFICE.

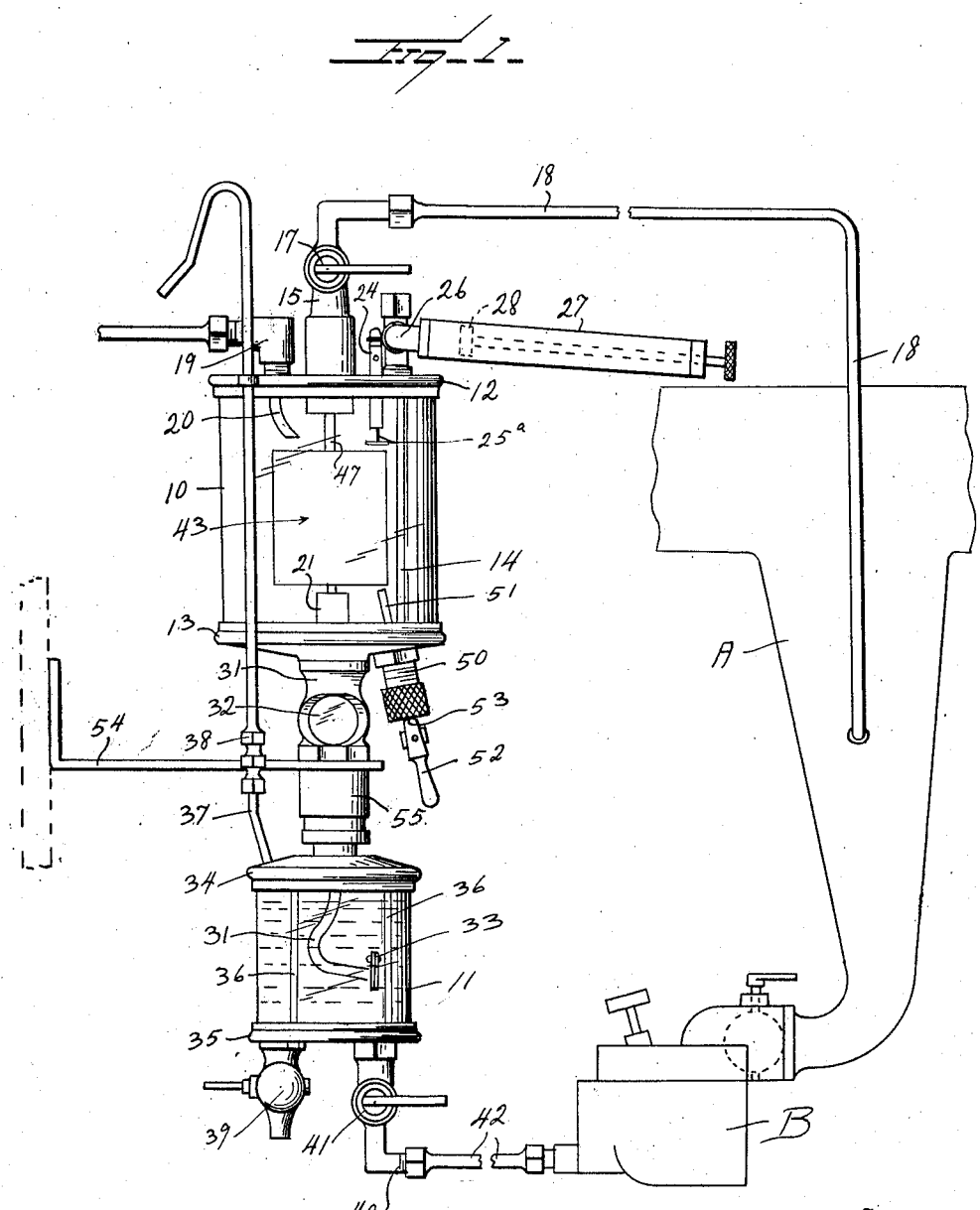

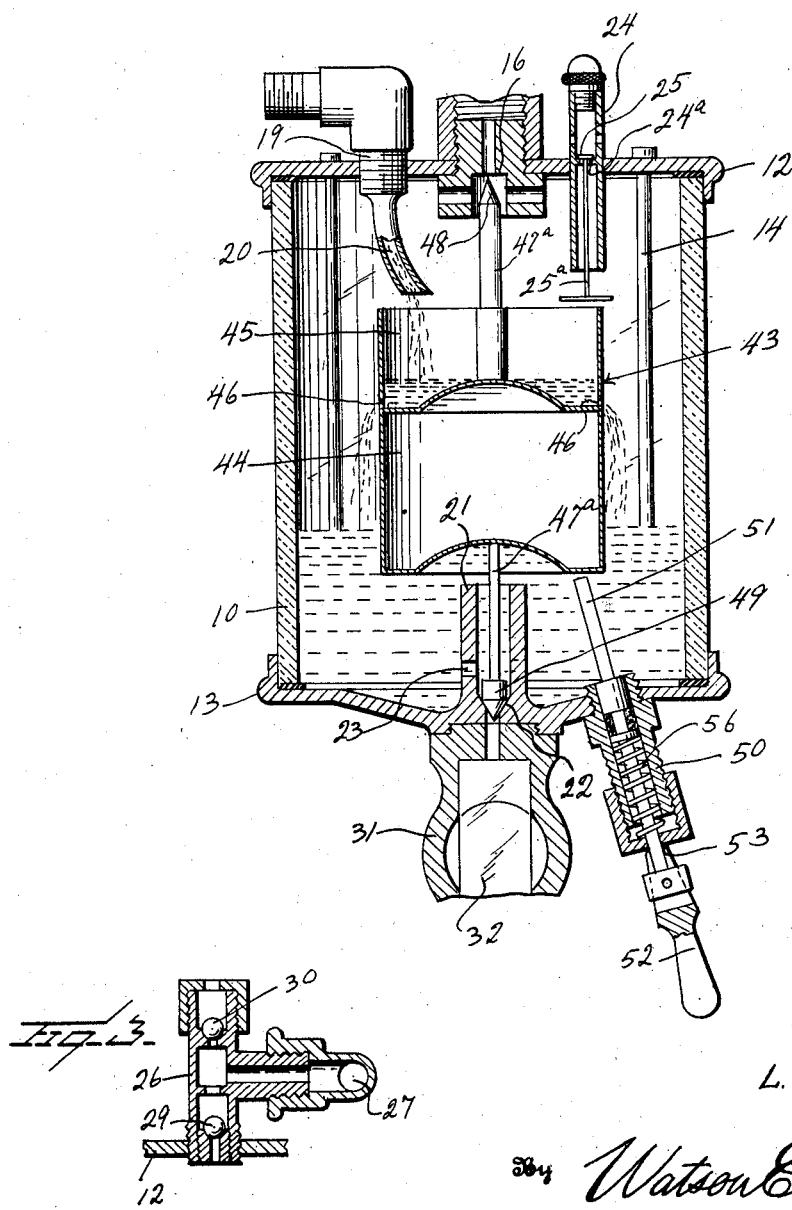

LELAND A. SHEALY, OF NEWBERRY, SOUTH CAROLINA, ASSIGNOR OF ONE-HALF TO JAMES D. QUATTLEBAUM, OF NEWBERRY, SOUTH CAROLINA.

VACUUM FUEL-FEED SYSTEM.

1,362,150.   Specification of Letters Patent.   Patented Dec. 14, 1920.

Application filed January 31, 1920. Serial No. 355,426.

*To all whom it may concern:*

Be it known that I, LELAND A. SHEALY, a citizen of the United States, residing at Newberry, in the county of Newberry and State of South Carolina, have invented certain new and useful Improvements in Vacuum Fuel-Feed Systems, of which the following is a specification, reference being had to the accompanying drawings.

This invention relates to internal combustion engines, and particularly to a suction feed for causing the delivery of fuel into a storage tank or container and delivery of the fuel to the carbureter of the engine.

My construction belongs to that class of fuel feeding devices in which there is an upper tank and a lower tank, the upper tank being connected to the intake pipe of the engine, while the lower tank is connected to the upper tank, and is also connected to the carbureter of the engine, the suction exerted in the manifold of the engine drawing gasolene into the upper container or tank, from which upper container the gasolene passes to the lower tank, and from thence, as needed, into the carbureter, and valves being provided cutting off communication between the upper tank and the intake manifold when the upper tank is filled, and at the same time opening communication between the upper tank and the lower tank to permit the fuel in the upper tank to pass into the lower tank, the descent of the level in the upper tank causing the opening of communication between the suction pipe leading to the intake manifold of the engine and the source of fuel so as to permit the upper tank to again fill.

One of the main objects of the present invention is to provide a construction of this kind which is extremely simple, which is positively operated, and which will not get out of order under service conditions.

A further object is to provide a construction of this kind having a float controlling the valves leading into the upper chamber, the float being so constructed that it will remain lowered until the fuel has reached a relatively high level in the upper tank, thus obviating the difficulty found in ordinary devices of this character that the float opens the delivery valve and closes the suction pipe when the upper tank is only partially filled with fuel.

Another object is to provide means whereby the float and the needle valves connected thereto may be manually lifted whenever desired without regard to the level of the liquid within the tank.

And a further object is to provide manually operable means whereby the air in the storage tank may be exhausted to cause the initial suction of fuel into the upper tank.

A further object is to provide a construction of this character which has very few parts, and which may be readily disassembled or assembled, and further which may be readily put in place and connected up with the intake manifold and the carbureter.

Other objects will appear in the course of the following description.

My invention is illustrated in the accompanying drawings, wherein:—

Figure 1 is an elevation of a gasolene feed mechanism constructed in accordance with my invention;

Fig. 2 is a vertical sectional view through the upper container or tank;

Fig. 3 is a sectional view through the T 26 and a portion of the pump barrel;

Fig. 4 is a fragmentary section of the lower end of the pipe 31 and valve 33, showing the valve open.

Referring to these drawings, 10 designates the upper tank or container and 11 the lower tank or container. The upper tank preferably has its outer wall formed of glass and is provided on its upper end with a cap 12 and on its lower end with a cap 13. These caps are held together and in liquid-tight engagement with the annular glass wall of the container by means of longitudinally extending bolts 14. The upper cap 12 is provided with a centrally disposed pipe 15 having therein a valve seat 16 and a valve 17 which is shown as in the form of a cock, though I do not wish to be limited to any particular form of valve. This pipe is angularly bent at its upper end and connected by any suitable tubular connection 18 to the intake pipe A of the internal combustion engine. This intake pipe A at its upper end is connected to the intake manifold of the engine, while at its lower end is connected to the carbureter B of any suitable or usual construction. The cap 12 is also provided with a fuel intake pipe 19 connected to any suitable fuel tank or other source of fuel, and this pipe enters the cap 12 and is provided with a downwardly and centrally inclined spout 20. The cap 13 has a centrally disposed outlet pipe 21 formed with a valve seat 22 this centrally disposed outlet having an upwardly extending, tubular portion formed with one or more perforations 23. The cap 12 is provided with a vent pipe or nipple 24 which will permit the inlet of air, but which, when under suction, will close the passage through the vent pipe. This nipple is formed with a valve seat $24^a$ and above the valve seat with vent openings. The valve seat coacts with a valve 25 having a long stem $25^a$ which extends downward into the chamber 10 and is provided at its lower end with a head. It will be obvious now that when the float, to be hereafter described, rises, it will strike the head of the valve stem $25^a$ and lift the valve 25, thus permitting air to enter the chamber or tank 10 until the float again lowers, and that when the float has lowered, the valve 25 will lower onto its seat $24^a$ and prevent the inlet of air.

The tank 10 is also connected by means of an elbow 26 to an air pump barrel 27 having therein a piston 28. This elbow is provided in its interior with two ball valves 29 and 30. When the piston 28 is moving outward in the barrel 27, the valve 29 will lift, permitting the air within the upper chamber or tank to pass into the barrel 27. At this time the check valve 30 closes. Upon the inward movement of the piston 28, however, the check valve 29 closes, the check valve 30 permitting the outward passage of the air. By this means, the interior of the tank 10 may be exhausted of air.

The outlet 21 discharges into a tubular section 31, which preferably includes in it a sight tube 32 having a sight opening, though this is not absolutely necessary, and this tube 31 extends downward into the chamber or tank 11 and is provided at its lower end with a valve 33 which will open to pressure within the tube 31 but which normally swings closed. This tank 31 is also formed with two heads or caps 34 and 35 and a transparent, annular wall, the caps being held against the ends of the wall by means of the bolts 36. From the chamber 11 extends a vent pipe 37, preferably made in two sections connected by a coupling 38, this vent pipe extending upward and then downward. A drain cock 39 permits the lower tank to be drained of gasolene whenever desired, and a discharge pipe 40 provided with a valve 41 leads from the lower end of the tank 11 and connects by means of a pipe section 42 to the carbureter B, as heretofore stated, thus acting to supply fuel to the carbureter.

Disposed within the upper tank 10 is a float, designated generally 43. The lower portion 44 of this float is hollow to form an air filled chamber, but the upper portion of the float is formed to provide a cup 45 having outlet perforations 46 in its side walls. These outlet perforations are relatively small and relatively few in number. The number and size of the perforations, however, will be governed by circumstances.

The spout 20 discharges into this cup-shaped upper end of float 44. Connected to this float and moving therewith are stems 47 and $47^a$ which extend above and below the float, and the upper end of the stem is formed with a valve 48 adapted to engage with the valve seat 16 when the float rises, and the lower end of the stem $47^a$ is formed with a valve 49 adapted to engage with the valve seat 22 in the outlet 21.

For the purpose of raising the float manually and thereby closing the outlet through the valve seat 29 and opening the outlet through the valve seat 22, I attach to the bottom cap 13 a stuffing box 50, through which passes a reciprocable pin 51. This pin at its outer end is connected to a lever 52, which lever projects beyond its point of pivotal connection with the pin and has a cam face 53 which bears against the face of the stuffing box so that when the lever is turned in one direction, the pin 51 will be withdrawn, and when turned in the other direction the pin 51 will be forced upward by spring 56 and will engage the float and lift it. It will be understood that in one position this manually operable device does not affect the float in any manner whatsoever but permits its free rise and fall, while when turned in the other direction, it lifts the float and holds it lifted until the lever 52 is returned to its normal position. The entire device may be supported by a bracket 54 engaging the outlet pipe 21 between the sight feed 32 and a nut 55.

The operation of this mechanism will be obvious to those skilled in the art. With the parts connected to the intake pipe A and the carbureter B as heretofore described, and with the lower tank more or less filled and with the upper tank but slightly filled with fuel, gasolene will be drawn from the lower tank 11 into the carbureter, this being controlled by the usual float feed of the carbureter. Inasmuch as there is very little fuel in the upper tank, the float 43 will have sunk, and as a consequence, the connection between the upper tank and the lower tank will be cut off, while communication will be opened through pipes 15 and 18 to the intake pipe beyond the throttle valve C thereof. As a consequence, the suction of the engine will cause air to be sucked from the upper portion of the tank 10 and this will cause fuel to flow in through the inlet pipe 19 and spout 20, which fuel will be discharged by the spout 20 into the cup-shaped upper portion of the float, from which it will run out through the openings 46 and gradually fill the tank 10. The float, because of the weight of the gasolene contained in the upper portion of it and because of the pressure of the stream of gasolene descending through the spout 20, will remain lowered until the liquid in the tank has risen approximately to the upper edge of the cup. Then the buoyancy of the float will overcome the weight on it and the float will rise. When it rises a certain amount, the float will strike the vent valve stem 25$^a$ and lift it, and the valve 48 will close against the valve seat 16 and cut off communication between the intake pipe and chamber 10. At the same time communication is established between the upper chamber and the lower chamber or tank 11 and the gasolene in the tank 10 descends through the pipe 21, opening the valve 33, and discharges into the lower tank, the air in the lower tank passing out through the vent pipe 37 and air entering the upper tank through the vent 24, to permit the discharge of gasolene therefrom. As soon as sufficient fuel has been discharged from the upper tank 10 into the lower tank, the float will fall, the gasolene in the upper portion of the float running out through the openings 46, and when the float falls, communication will be again opened between the suction pipe 18 and the upper portion of the chamber 10, and once more this suction will cause the flow of fuel into the pipe 19 and the spout 20 and the operation will be repeated. This operation will continue indefinitely so long as the engine is operating.

If, for any reason, it be impossible to start up the engine, both tanks being empty or nearly empty, then vacuum may be created in the upper portion of the tank 10 by operating the pump 27 and this will cause the flow of fuel into the tank 10 until the float has raised sufficiently to discharge the contents of the tank 10, and then the operation is automatically carried on in the manner heretofore stated.

Whenever it is desired to raise the float in order to permit the flow of gasolene from the upper tank into the lower tank, assuming that there is not sufficient gasolene in the upper tank to cause the lifting of the float and there is a lack of gasolene in the lower tank, this can be accomplished by shifting the pin 51 upward so as to lift the float, thus holding it up until the lower tank has been filled.

It will be seen that this device is very simple and that there are no springs or like instrumentalities used to control the operation of the several valves. This is of particular advantage, because spring actuated mechanism is of a more or less delicate construction and the springs must be accurately adjusted in order to operate properly at all times. If the springs are too strong, they do not permit the proper operation of the float, and if they are too weak, they will not resist the movement of the float sufficiently. By providing a float of the peculiar character described, I prevent an upward movement of the float until the chamber or tank 10 is nearly entirely filled. In other devices of this character known to me where springs are not used for restraining the upward movement of the float, the float will rise and permit the descent of gasolene into the lower chamber when a relatively small amount of gasolene has gathered in the upper chamber or tank. It will be seen that my float is centered, both at its upper and lower ends, by means of the central stems which extend up into the suction outlet and downward into the discharge outlet of the upper tank or chamber. Thus, the valves carried by said float can never get unseated no matter how much the machine may be jarred or oscillated under service conditions. Inasmuch as this float normally controls the operation of the mechanism, and as this float is of the simple character described, it is obvious that there will be no parts that can get out of order.

It is to be particularly noted that the construction of this float is such that the float remains raised by reason of its buoyancy a sufficient length of time for the greater portion of the contents of chamber 10 to pass into chamber 11. As before remarked, the fuel within the chamber 10 must rise up approximately to the level of the upper edge of the cup 45 before the float will rise to lift the valve 49 and establish communication between the chamber 10 and the chamber 11 and cut off communication between the chamber 10 and the intake pipe of the engine. At this time, suction having ceased, no fuel is delivered through the spout 20. Now when the level has descended below the openings 46, all of the liquid in the cup has been discharged, thus lightening the cup so that as regards the total effect, the float is more buoyant than it was before, and, therefore, the liquid fuel within the chamber 10 may descend a considerable distance before the float descends. Once the float has descended, however, it remains in its lowered position until the liquid level has again risen approximately to the top of the cup. I thus secure a "dwell" when the float is lowered and a "dwell" when the float is raised sufficient to permit the approximate filling of the chamber 10 or practically the emptying of the greater portion of the chamber 10 before the float acts.

While I have illustrated certain details of construction and arrangement of parts which in practice have been found thoroughly effective, yet it is obvious that many modifications might be made in these details of construction without departing from the spirit of the invention. Thus, the two tanks might be made practically as one. The pipe connections might be differently arranged, and many other changes might be made which would adapt the device to some particular form of engine or which would reduce the number of parts.

Attention is particularly called to one very effective feature of this invention, which is that a reserve supply of fuel is always retained within the chamber 10, but when fuel ceases to flow through the pipe 19 and spout 20, indicating that the fuel has been exhausted from the main source of fuel, the float will, of course, remain in its lowered position, preventing the discharge of fuel from the container 10 into the container 11 and thus the operator is warned that the supply of fuel has been practically exhausted and that he should again fill his supply tank. Under these circumstances, however, the driver may force up the float 44 by means of the pin 53 in the manner heretofore stated and this will open the needle valve 49 and allow the reserve fuel within the tank 10 to pass down into the tank 11, and thus to his carbureter, thus permitting the driver to get home or to a gasolene station, where he will again fill his fuel tank, and the driver will know when no more fuel passes into the tank 10 that it is time that the fuel tank should be filled.

I claim:—

1. In a mechanism of the character described, a chamber having a discharge opening in its bottom and having a vent opening in its top, a valve controlling the vent opening, a float disposed in the chamber and having a valve closing said discharge opening of the chamber when the float is lowered, said float, when raised opening passage through the discharge opening, and shifting the vent valve to its open position, said float having a buoyant lower portion and a cup-shaped upper portion formed in its wall and adjacent the bottom of the cup-shaped portion with relatively contracted, constantly open outlet openings, and a discharge pipe entering the upper portion of the chamber and discharging above and into the cup-shaped portion of the float.

2. In a gasolene feeding mechanism of the character described, an upper chamber and a lower chamber, the lower chamber being adapted to be connected to a carbureter and the upper chamber having a suction outlet connection adapted to be connected to the intake pipe of an internal combustion engine above the throttle valve thereof, the upper chamber having a fuel inlet pipe and an air vent valve, a float disposed within the upper chamber and carrying a valve stem formed on its upper end, when the float rises, to cut off communication between the suction connection and the interior of the chamber, and when it falls, to open said connection, and formed at its lower end to open communication between the said chambers when the float rises, and when it falls to cut off communication between the said chambers, means being provided whereby the vent valve will be lifted from its seat when the float rises beyond a predetermined point and closed against the seat when the float lowers beyond a predetermined point, and manually operable means for lifting the float.

3. In a gasolene feeding mechanism of the character described, an upper chamber and a lower chamber, the lower chamber being adapted to be connected to a carbureter and the upper chamber having a suction outlet connection adapted to be connected to the intake pipe of an internal combustion engine above the throttle valve thereof, the upper chamber having a fuel inlet pipe and an air vent valve, a float disposed within the upper chamber and carrying a valve stem formed on its upper end, when the float rises, to cut off communication between the suction connection and the interior of the chamber, and when it falls, to open said connection, and formed at its lower end to open communication between the said chambers when the float rises, and when it falls to cut off communication between the said chambers, means being provided whereby the vent valve will be lifted from its seat when the float rises beyond a predetermined point and closed against the seat when the float lowers beyond a predetermined point, and manually operable means for lifting the float, said means consisting of a reciprocatable member engageable at its inner end with the float and extending through the wall of the chamber.

4. In a gasolene feeding mechanism of the character described, an upper chamber and a lower chamber, the lower chamber being adapted to be connected to a carbureter and the upper chamber having a suction outlet connection adapted to be connected to the intake pipe of an internal combustion engine above the throttle valve thereof, the upper chamber having a fuel inlet pipe and an air vent valve, a float disposed within the upper chamber and carrying a valve stem formed on its upper end, when the float rises, to cut off communication between the suction connection and the interior of the chamber, and when it falls, to open said connection, and formed at its lower end to open communication between the said chambers when the float rises, and when it falls to cut off communication between the said chambers, means being provided whereby the vent valve will be lifted from its seat when the float rises beyond a predetermined point and closed against the seat when the float lowers beyond a predetermined point, and manually operable means for lifting the float, said means consisting of a reciprocatable member engageable at its inner end with the float and extending through the wall of the chamber and having means on its exterior whereby it may be held in its raised or its lowered position.

5. In a gasolene feeding mechanism of the character described, an upper chamber and a lower chamber, the lower chamber being adapted to be connected to a carbureter and the upper chamber having a suction outlet connection adapted to be connected to the intake pipe of an internal combustion engine above the throttle valve thereof, the upper chamber having a fuel inlet pipe and an air vent valve, and a float disposed within the upper chamber and carrying a valve stem formed on its upper end, when the float rises, to cut off communication between the suction connection and the interior of the chamber, and when it falls, to open said connection, and formed at its lower end to open communication between the said chambers when the float rises, and when it falls to cut off communication between the said chambers, and means connected to the upper chamber whereby the air may be manually exhausted therefrom.

6. In a gasolene feeding mechanism of the character described, an upper chamber and a lower chamber, the lower chamber being adapted to be connected to a carbureter and the upper chamber having a suction outlet connection adapted to be connected to the intake pipe of an internal combustion engine above the throttle valve thereof, the upper chamber having a fuel inlet pipe and an air vent valve, and a float disposed within the upper chamber and carrying a valve stem formed on its upper end, when the float rises, to cut off communication between the suction connection and the interior of the chamber, and when it falls, to open said connection, and formed at its lower end to open communication between the said chambers when the float rises, and when it falls to cut off communication between the said chambers, an air pump barrel operatively connected to the upper end of the upper chamber and having a piston, and valves permitting air to be withdrawn from the upper part of the upper chamber.

7. In a gasolene feeding mechanism of the character described, an upper chamber and a lower chamber, the lower chamber being adapted to be connected to a carbureter and the upper chamber having a suction outlet connection adapted to be connected to the intake pipe of an internal combustion engine above the throttle valve thereof, the upper chamber having a fuel inlet pipe and an air vent valve, a float disposed within the upper chamber and carrying a valve stem formed on its upper end, when the float rises, to cut off communication between the suction connection and the interior of the chamber, and when it falls, to open said connection, and formed at its lower end to open communication between the said chambers when the float rises, and when it falls to cut off communication between the said chambers, means connected to the upper chamber whereby the air may be manually exhausted therefrom, and a manually operable valve disposed in the suction connection whereby communication may be cut off between the upper portion of the chamber and the intake pipe of the engine.

8. In a gasolene feeding mechanism of the character described, an upper chamber and a lower chamber, the lower chamber being adapted to be connected to a carbureter and the upper chamber having a suction outlet connection adapted to be connected to the intake pipe of an internal combustion engine above the throttle valve thereof, the upper chamber having a fuel inlet pipe and an air vent valve, and a float disposed within the upper chamber and carrying a valve stem formed on its upper end, when the float rises, to cut off communication between the suction connection and the interior of the chamber, and when it falls, to open said connection, and formed at its lower end to open communication between the said chambers when the float rises, and when it falls to cut off communication between the said chambers, said float comprising a buoyant, lower portion and a cup-shaped upper portion having outlet openings in its side wall, the fuel inlet being connected to a spout discharging into said cup-shaped portion.

9. A fuel feeding device of the character described including an upper chamber and a connected lower chamber, the lower chamber having a vent pipe and being adapted to be connected at its lower end to a carbureter, the upper chamber having at its upper end a suction pipe connection adapted to be connected to the intake manifold of the engine and having an air vent and a fuel inlet pipe, a valve controlling the air vent and having a downwardly extending stem, the fuel inlet pipe having a spout directed downward and centrally into the upper chamber, a float disposed within the upper chamber having a buoyant, lower portion and a cup-shaped upper portion into which said spout discharges, the wall of said cup-shaped upper portion having outlets adjacent its lower end, the float carrying a centrally disposed valve stem formed to provide valves at its opposite ends, one of said valves, when the float is lifted, closing communication between the upper chamber and the suction pipe, and the other of said valves, when the float is lowered, closing communication between the upper chamber and the lower chamber, said float, when it is raised, striking the stem of the air vent valve and causing the air vent valve to open, a manually operable valve in the suction pipe whereby the suction pipe may be cut off, means connected to the upper end of the air tank whereby air may be manually exhausted from the upper tank, means for manually raising the float and holding it raised, and an outwardly opening valve permitting the flow of liquid from the upper tank into the lower tank but preventing back flow of liquid therefrom, and a vent pipe extending from the lower tank.

10. A fuel feeding device of the character described including a receiving chamber, said chamber at its upper end being adapted to be connected to suction means, the lower end of said chamber having a discharge opening, a float disposed in the said chamber, and coacting valves connected to said float and adapted, when the float is raised beyond a predetermined point, to cut off communication between the chamber and the intake pipe, and when the float is lowered beyond a predetermined point, to cut off discharge from the lower end of the chamber, an air vent opening into the upper portion of said chamber and having a valve opened upon the rise of the float beyond a predetermined point, but closed upon the descent of the float, means for discharging liquid into the chamber, the float being so formed as to remain in its lowered position until the level of the liquid has risen in the chamber to the approximate level of the top of the float, and means being provided whereby the buoyancy of the float is increased after the float has risen and opened the discharge outlet to thereby cause the float to be retained in its raised position until a predetermined amount of liquid has been discharged from the chamber.

11. A device of the character described including a receiving chamber having a discharge opening in its lower end and connected at its upper end to suction means, said chamber at its upper end having a vent opening, a valve normally closing said vent opening, a float disposed in the chamber and carrying oppositely disposed valves, one of said valves, when the float is lowered, closing the discharge opening, and the other of said valves, when the float is raised, closing the suction opening, said float, when raised, lifting the vent valve, the lower portion of the float being formed to provide an air chamber, the upper portion of the float being formed to provide a cup having openings at its bottom to permit the discharge of liquid therefrom, and a liquid inlet spout discharging into said cup.

12. A float feeding device for internal combustion engines including a chamber having a fuel inlet and a suction pipe, a fuel outlet, a float controlled valve controlling said fuel-outlet and controlling communication between the exhaust passage and the chamber, said float descending causing the outlet valve to cut off the discharge of fluid from the chamber before the fluid has entirely discharged from the chamber, and manually operable means extending through the wall of the float chamber and adapted to lift said float and the valve to permit the discharge of the fuel retained in the chamber by the valve.

13. A fuel supplying mechanism for internal combustion engines including a tank having a transparent wall whereby the contents of the tank may be observed, the tank having a fuel inlet, a suction passage and a fuel outlet, the suction passage and fuel outlet being formed to provide valve seats, a float disposed within the chamber and when at the upper end of its movement causing the valve to close the suction passage to open the discharge outlet passage, and when lowered beyond a predetermined point opening the suction passage and closing the discharge passage, and means extending through the wall of the tank whereby the float may be raised to open the discharge passage to permit the discharge of fuel from the tank.

In testimony whereof I hereunto affix my signature.

LELAND A. SHEALY.